US010363985B2

(12) United States Patent
Muller

(10) Patent No.: US 10,363,985 B2
(45) Date of Patent: Jul. 30, 2019

(54) HOLDER

(71) Applicant: ABUS AUGUST BREMICKER SOHNE KG, Wetter-Volmarstein (DE)

(72) Inventor: Thomas Muller, Bischoffen (DE)

(73) Assignee: Abus August Bremicker Sohne KG, Wetter-Volmarstein (DE)

( * ) Notice: Subject to any disclaimer, the term of this patent is extended or adjusted under 35 U.S.C. 154(b) by 122 days.

(21) Appl. No.: 15/452,010

(22) Filed: Mar. 7, 2017

(65) Prior Publication Data

US 2017/0267305 A1    Sep. 21, 2017

(30) Foreign Application Priority Data

Mar. 15, 2016  (DE) ........................ 10 2016 104 798

(51) Int. Cl.

| F16B 2/10 | (2006.01) |
|---|---|
| B62J 99/00 | (2009.01) |
| B62H 5/00 | (2006.01) |
| F16B 2/18 | (2006.01) |
| B25B 5/10 | (2006.01) |
| B62J 11/00 | (2006.01) |
| B62K 19/40 | (2006.01) |

(52) U.S. Cl.
CPC .............. B62J 99/00 (2013.01); B25B 5/104 (2013.01); B62H 5/00 (2013.01); B62J 11/00 (2013.01); B62K 19/40 (2013.01); F16B 2/10 (2013.01); F16B 2/185 (2013.01)

(58) Field of Classification Search
USPC ................................. 248/309.1, 316.1, 316.5
See application file for complete search history.

(56) References Cited

U.S. PATENT DOCUMENTS

| 631,665 A | 8/1899 | Potter |
|---|---|---|
| 4,269,049 A | 5/1981 | Henderson |
| 5,145,138 A | 9/1992 | Schlanger et al. |
| 5,179,590 A * | 1/1993 | Wang .................. B60R 11/0241 224/482 |
| 5,201,501 A | 4/1993 | Fassler |

(Continued)

FOREIGN PATENT DOCUMENTS

| DE | 938532 B | 2/1956 |
|---|---|---|
| DE | 4110221 A1 | 10/1992 |

(Continued)

OTHER PUBLICATIONS

European Search Report dated Jul. 31, 2017.

*Primary Examiner* — Monica E Millner
(74) *Attorney, Agent, or Firm* — Amster, Rothstein & Ebenstein

(57) ABSTRACT

A holder for a two-wheeler accessory, in particular for a two-wheeler lock, comprises a base body by which a contact surface is defined which the two-wheeler accessory contacts when it is received in the holder and one or more pivot clips that each comprise a holding limb and a lever limb and are pivotable about a pivot axis beyond a dead center between a release position and a securing position in order to allow a receiving of the two-wheeler accessory in the holder or a removal of the two-wheeler accessory from the holder in the release position and to block the two-wheeler against a removal from the holder in the securing position by means of the holding limb when said two-wheeler accessory is received in the holder.

26 Claims, 4 Drawing Sheets

(56) References Cited

U.S. PATENT DOCUMENTS

| | | | |
|---|---|---|---|
| 5,215,231 | A | 6/1993 | Paczonay |
| 5,572,776 | A | 11/1996 | Murphy et al. |
| 6,056,332 | A | 5/2000 | Foster |
| 6,059,245 | A * | 5/2000 | Hermansen ............... B62J 11/00 248/311.2 |
| 6,520,466 | B1 | 2/2003 | Blanchard, III et al. |
| 7,920,905 | B2 * | 4/2011 | Bury .................. B60R 11/0241 379/445 |
| 8,973,880 | B2 | 3/2015 | Goffman |
| 8,998,048 | B1 * | 4/2015 | Wu .......................... B62J 11/00 224/420 |
| 2008/0296979 | A1 | 12/2008 | Kato et al. |
| 2010/0181455 | A1 | 7/2010 | Ou et al. |
| 2010/0264182 | A1 * | 10/2010 | Perlman ................. H04M 1/04 224/409 |
| 2015/0076160 | A1 | 3/2015 | Frenal et al. |
| 2016/0215527 | A1 | 7/2016 | Steinkamp |

FOREIGN PATENT DOCUMENTS

| | | |
|---|---|---|
| DE | 19713704 A1 | 10/1998 |
| DE | 202007011170 U1 | 12/2007 |
| DE | 102006030498 A1 | 1/2008 |
| DE | 102006036031 A1 | 2/2008 |
| DE | 202014103690 U1 | 8/2014 |
| EP | 0523379 A1 | 1/1993 |
| EP | 1284448 A2 | 2/2003 |
| EP | 1973313 A1 | 9/2008 |
| EP | 2860439 A2 | 4/2015 |

\* cited by examiner

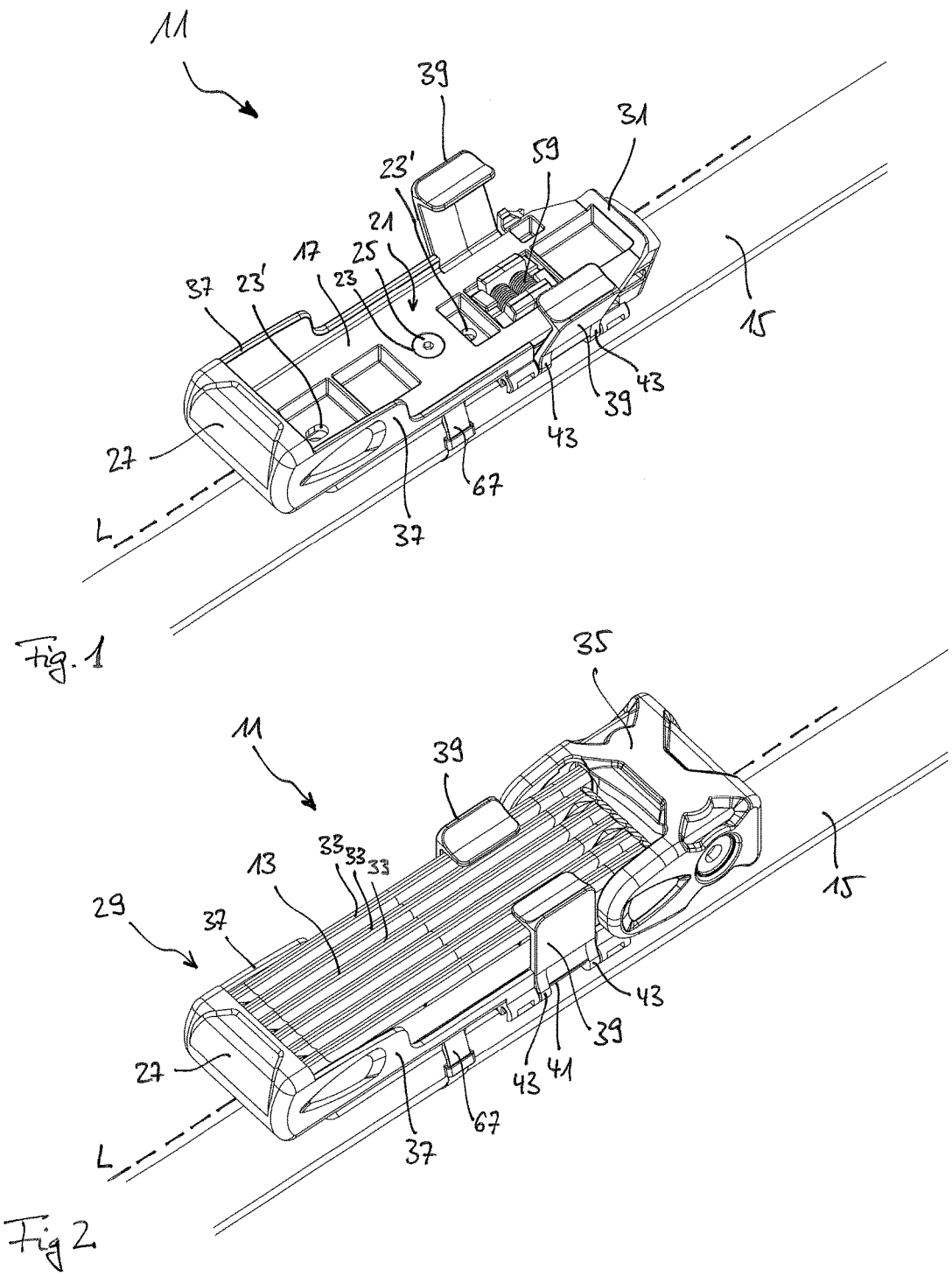

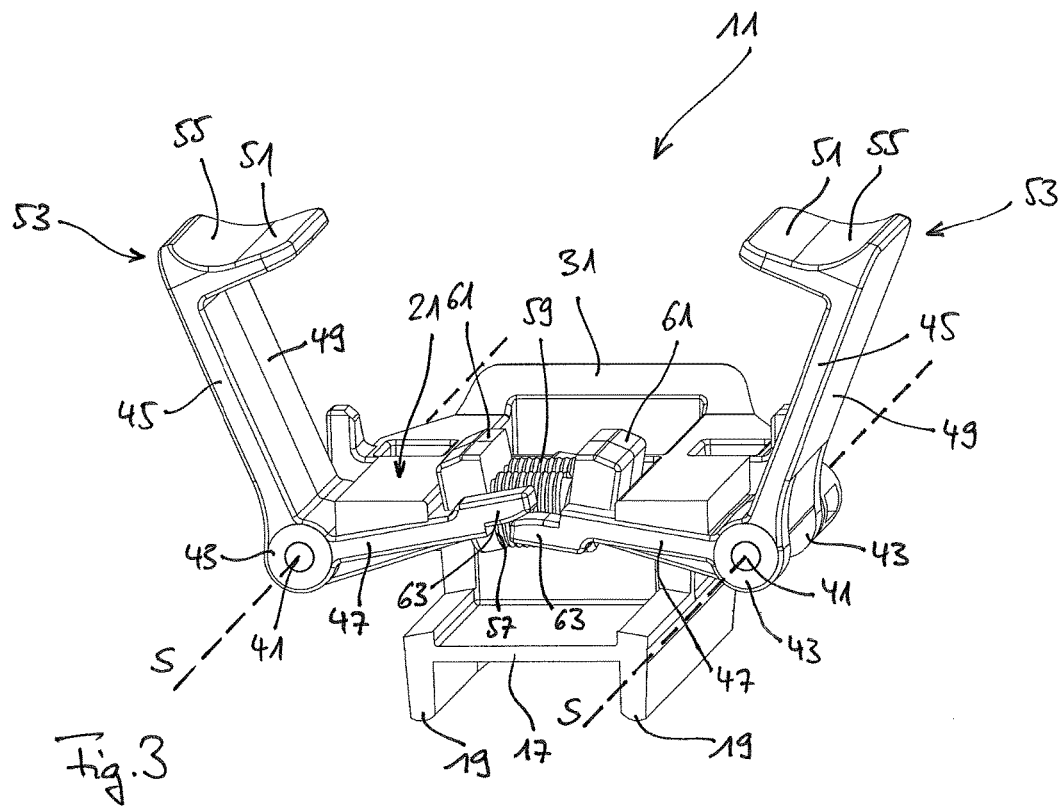

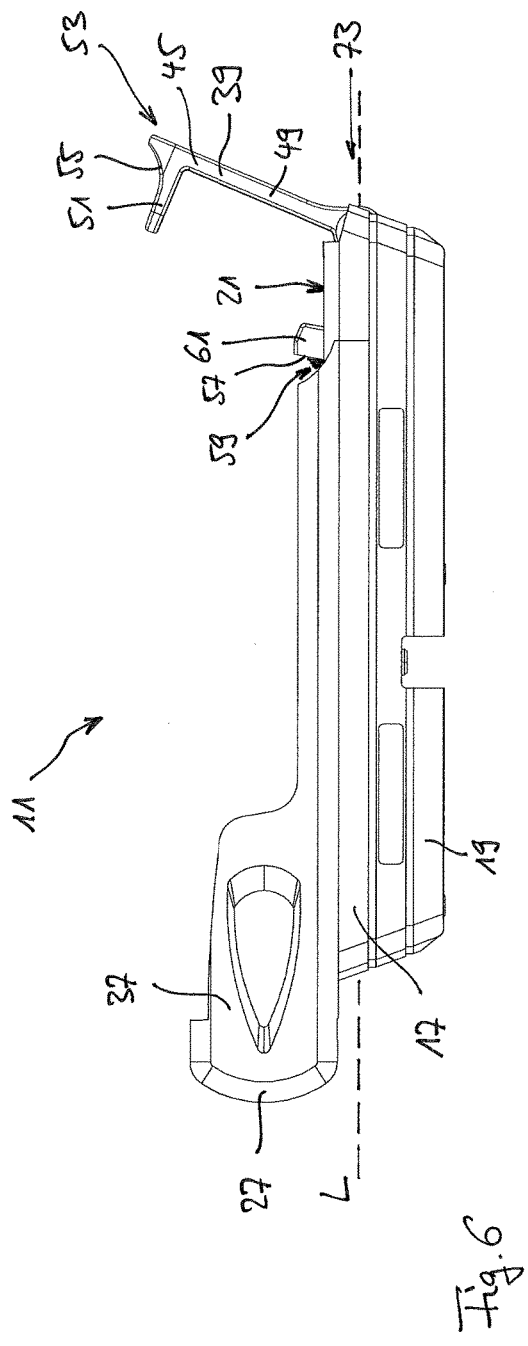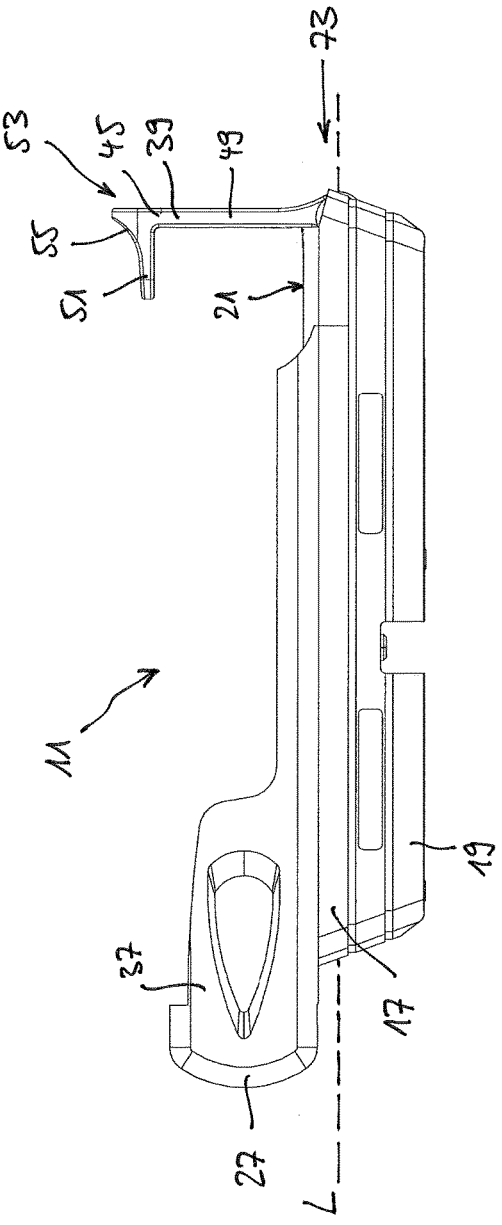

HOLDER

The present invention relates to a holder for a two-wheeler accessory, in particular for a two-wheeler lock, preferably for a folding lock.

Due to the typically comparatively restricted stowage space at a two-wheeler, it is advantageous to provide a separate holder for some accessories. Locks for securing the two-wheeler in the parked state in particular also always have to be carried along as a rule. If it is in this respect not a lock, for instance a frame lock, fixedly mounted to the two-wheeler, a holder can therefore be provided at the two-wheeler for a lock, or also for a different accessory carried along loosely.

The most important task of the holder in this respect is a reliable holding of the accessory received therein so that it cannot be lost, in particular during the ride, and above all does not put the safety of the rider at risk (e.g. if it were to fall out of the holder into the spokes of a wheel). It is, however, desirable in this respect if both the insertion of the accessory into the holder and the removal of the accessory from the holder is possible in a particularly simple manner. The holder should additionally be as compact as possible to be able to be attached to the two-wheeler without hindering the rider.

It is known to fasten two-wheeler locks to a two-wheeler in that they are connected directly to a holder, that is they can only be released by unlocking from the holder using the respective key. The holder can simply provide an eyelet for this purpose, for example, through which the lock is guided and subsequently locked. While this kind of arrangement is particularly reliably secured against accidental release, it is in particular not suitable for a folding lock. For unlike with a spiral lock, for instance, with a folding lock the bars of the folding lock could unfold in an uncontrolled manner if they are not held in some manner in the folded state, which could represent a risk during riding. In addition, such a connection of the lock to the two-wheeler is not comfortable to the extent that the lock has to be respectively locked for its stowing at the two-wheeler and has to be unlocked again before use. Operating the holder is, however, the more comfortable, the more fluid the movement routine on the insertion and removal of the lock into or out of the holder can be.

It is to be preferred in this regard if the accessory to be held does not have to be separately locked or opened for its stowing at the two-wheeler. It is furthermore even more advantageous if the holder also does not have to be separately locked or opened but can rather be adjusted automatically or at least as independently as possible, in particular assisting a user, between a state that allows an insertion of the accessory into the holder or a removal of the accessory from the holder and a state in which the accessory received in the holder is blocked against a removal from the holder.

It is an object of the invention to provide a holder for a two-wheeler accessory or a two-wheeler accessory having a holder that is compact and can be operated in a comfortable manner and simultaneously offers high reliability in the holder of the two-wheeler accessory at a two-wheeler.

The object is satisfied by a holder having the features of claim 1.

The holder in this respect comprises a base body by which a contact surface is defined which the two-wheeler accessory contacts when it is received in the holder and one or more pivot clips that each comprise a holding limb and a lever limb and are pivotable about a pivot axis beyond a dead center between a release position and a securing position in order to allow a receiving of the two-wheeler accessory in the holder and a removal of the two-wheeler accessory from the holder in the release position and to block the two-wheeler against a removal from the holder in the securing position by means of the holding limb when said two-wheeler accessory is received in the holder.

The base body thus in particular represents a static part of the holder, while the respective pivot clips, i.e. the one or more pivot clips, are movable. The holder can thus be configured to be fastened to the two-wheeler, in particular to a frame of the two-wheeler, at the base body. In addition, the named contact surface for applying the two-wheeler accessory is defined by the base body such that the accessory can be arranged in a stable manner and in particular at a defined position at the two-wheeler via the base body.

The contact surface can in this respect be configured as a surface at the base body. It can, however, also only be defined by the base body in that the latter has a structure (that is not necessarily planar and not necessarily continuous) at which the accessory can be applied. Such a structure can, for example, only have support points and/or support edges at which the accessory is supported when it is received in the holder. The contact surface can then be extrapolated from such support points and/or support edges. The contact surface is in this respect preferably continuous and at least substantially planar but does not have to be exactly planar, but can rather, for example, also have a specific curvature, in particular in parallel with and/or perpendicular to a longitudinal direction of the base body or can be adapted in a specific manner to the shape of the two-wheeler accessory.

The pivotability of the respective pivot clips allows (at least) two defined states of the holder. In a releasing state in which the pivot clips are in their respective release positions, the two-wheeler accessory can be received in the holder or, if it is already received in the holder, can be removed from the holder. In a securing state in which the pivot clips are in their respective securing positions, the pivot clips are arranged or aligned such that the two-wheeler accessory can, in contrast, not be removed from the holder when it is received in the holder, but is prevented from doing so by the holding limbs of the pivot clips.

The holder does not necessarily have to be closed for this purpose so that the accessory is completely surrounded by the holder. A locking of the holder, that is a separate securing of the pivot clips in the securing position to block them against a pivoting into the release position is in particular also not required. The pivot clips can rather only be arranged or aligned relative to the accessory received in the holder in the securing position such that they counteract a movement of the accessory out of the holder, in particular away from the contact surface of the base body. The holding limbs of the pivot clips, if a plurality of pivot clips are provided, are preferably spaced apart from one another in the securing position.

When pivot clips are spoken of in the plural here or in the following, the respective pivot clips, that is the pivot clips present at the holder, are meant. Consequently, as long as the number of pivot clips (e.g. two or more) is not expressly defined, also only a single pivot clip can respectively be meant despite the use of the plural. The same applies accordingly to elements of the pivot clips such that, for example, the holding limbs (of the pivot clips) named in the plural can also only mean the holding limb of a single pivot clip present at the holder.

Due to the described pivotability of the pivot clips, the holder can be considered as a bistable system with the release position and the securing position of the pivot clips as the stable positions and the dead center located therebetween as the unstable transition position of the system. Since a transition from the release position into the securing position and vice versa from the securing position into the release position in each case runs over the dead center, the pivot clips are protected and stabilized to this extent by the dead center against an accidental adjustment, for instance as a result of vibrations during riding.

It is in this respect an essential aspect of the invention that a spring apparatus is provided that acts on the respective lever limb and that is configured to preload the respective pivot clip into the release position at one side of the dead center and into the securing position at the other side of the dead center. Said dead center is therefore very substantially realized by means of the named spring apparatus. The spring apparatus in this respect advantageously actually acts in that the forces exerted onto the respective pivot clip by it preload the pivot clip into the release position or into the securing position in dependence on whether it is located (with respect to the course of its pivotability) at the one or the other side of the dead center. Conversely viewed, the dead center is actually defined by this property of the spring apparatus, namely as that position of the respective pivot clip in which a change of direction takes place in which the spring apparatus preloads the respective pivot clip.

In this respect, the spring apparatus acts on the lever limb, but preferably not on the holding limb of the respective pivot clip. Whereas the holding limb thus above all serves to block the accessory received in the holder against a removal from the holder in the securing position of the respective pivot clip, the lever limb of the respective pivot clip can in particular serve as point of engagement for the preload by the spring apparatus. In this respect, the lever limb and the holding limb of the respective pivot clip are preferably connected to one another, in particular rigidly, such that an application of force onto the lever limb in the peripheral direction with respect to the pivot axis is transmitted from the lever limb to the holding limb so that the holding limb is pivoted (as part of its pivotability) about the pivot axis.

A section of the pivot clip extending, beginning from the pivot axis, is preferably to be understood as the limb of a respective pivot clip in this respect. The holding limb and the lever limb of a respective pivot clip are in this respect in particular such sections that are separate from one another.

The spring apparatus can be supported against the base body of the holder, for example, to act on the lever limb of the respective pivot clip. If the holder comprises two pivot clips, the spring apparatus is, however, preferably effective between the lever limbs of the two pivot clips. The spring apparatus can in this respect also be effective pairwise between two respective pivot clips of the holder. The fact that the spring apparatus is effective between two lever limbs in particular means in this respect that the spring apparatus is supported with respect to the action on the respective one of the two lever limbs at the other one of the two lever limbs.

In accordance with an advantageous further development, the respective lever limb has an application surface for the action by the spring apparatus that faces away from the respective pivot axis. If the spring apparatus is supported against the base body of the holder, the spring apparatus can in particular preload the lever limb in the direction of a larger spacing of the application surface of the lever limb from an application surface that is formed at the base body and against which the spring apparatus is supported.

If the holder comprises a plurality of pivot clips, in particular two, the spring apparatus is preferably provided between the application surfaces of the lever limbs of the pivot clips and preloads the application surfaces as a compression spring in a direction away from one another. In such an embodiment, the application surfaces of the lever limbs of the two pivot clips in particular have the smallest spacing from one another when, with respect to the pivot axis of the respective pivot clip, the application surfaces face radially in the direction of the pivot axis of the respective other pivot clip.

Since the spring apparatus acts as a compression spring that urges the application surfaces away from one another (or the application surface away from the base body), which is possible in two different pivot directions, this position of the smallest spacing can form said dead center. Starting from this dead center, the spacing of the application surfaces increases both in the direction of the release position and in the direction of the securing position, which respectively corresponds to a decreasing spring force of the compression spring. On a pivoting of the pivot clips out of the release position or out of the securing position into the respective other position, the spacing of the application surfaces with respect to the increasing spring force of the compression spring is thus first respectively reduced until the dead center is reached. An external force exceeding this spring force consequently has to be applied for this purpose. After overcoming the dead center, the compression spring in contrast assists the further pivoting of the pivot clips such that the pivot clips are pivoted from the dead center up to and into the respective target position without an external exertion of force and in this respect automatically simply only by the spring preload.

In accordance with an embodiment, the spring apparatus is formed by at least one helical spring, preferably by two helical springs arranged adjacent. Sufficiently high forces can thereby be achieved to stabilize the release position and the securing position with a small requirement of construction space. The respective application surface is in this respect preferably provided with at least one projection that projects into a respective helical spring to secure the helical spring against lateral slippage. The respective application surface can in particular have a respective projection for each helical spring acting on it. This simultaneously allows a simple assembly of the pivot clips with the helical springs and a reliable positional security of the helical springs so that they reliably cooperate with the application surfaces in all the pivot positions from the release position over the dead center up to the securing position.

It is furthermore advantageous if the lever limb of at least one pivot clip has a releasing section that projects beyond the contact surface in the direction away from the base body in the release position and preferably also in a position corresponding to the dead center, but not in the securing position of the respective pivot clip. The fact that the releasing section projects beyond the contact surface can then in particular have the consequence that the releasing section is acted on by the two-wheeler accessory on the applying of the two-wheeler accessory to the contact surface. Such an application is then preferably directed in the direction of the contact surface such that the releasing section is advantageously urged back at least so far that is no longer projects beyond the contact surface.

In such an embodiment, a pivoting of a pivot clip having such a releasing section out of its release position in the direction of its securing position can be triggered by the receiving of the two-wheeler accessory in the holder, in particular by the application of the accessory to the contact surface taking place in so doing. If the dead center of the pivot movement is also overcome in the named urging back of the releasing section behind the contact surface, the pivot clip can subsequently only be pivoted further up to and into the securing position independently due to the preload of the spring apparatus and is then preferably additionally held in this position by the preload.

In such an embodiment, the pivot clips can consequently be transposed into the securing position automatically, that is without being directly actuated by hand, when the two-wheeler accessory is inserted into the holder, namely actually in that the two-wheeler accessory is inserted into the holder and in so doing is applied to the contact surface. A particularly comfortable operation of the holder is possible in this manner since the two-wheeler accessory only has to be completely inserted into the holder and is then secured against a removal without a securing step, for instance a locking of the holder or a separate actuation of an element of the holder, that has to be carried out separately becoming necessary.

Conversely, the releasing section can advantageously again project through the contact surface beyond the contact surface on a pivoting of the respective pivot clip out of the securing position into the release position such that the two-wheeler accessory that may be received in the holder is pressed away from the contact surface. Such an action on the two-wheeler accessory is assisted by the preload of the spring apparatus from the dead center onward so that the accessory optionally jumps at least partially away from the contact surface on an upward pivoting of the pivot clips. The removal of the accessory from the holder can hereby be simplified, whereby the comfort in the operation of the holder is in turn improved.

In accordance with an advantageous further development, the releasing section projects in the peripheral direction from a lever section of the respective lever limb oriented at least primarily radially with respect to the respective pivot axis, wherein the lever section is preferably arranged beneath the contact surface independently of the position of the respective pivot clip. The respective lever limb can therefore in particular be angled with the radially extending lever section and the releasing section projecting at least substantially at a right angle therefrom. The releasing section then projects over the contact surface at least substantially in the peripheral direction in the release position of the respective pivot clip with respect to its pivot axis and is therefore urged back in the opposite peripheral direction when the two-wheeler accessory is received in the holder. Since interactions with the two-wheeler accessory thus take place at least substantially in the peripheral direction, the respective torque about the pivot axis is, on the one hand, advantageously maximized and the radial action on the pivot axis is minimized, on the other hand.

In accordance with a further advantageous embodiment, it is preferred if the respective lever limb has an entrainer, wherein, if the holder comprises a plurality of pivot clips, in particular two, the entrainer of the lever limb of one of the pivot clips and the entrainer of the lever limb of another of the pivot clips engage into one another, in particular loosely, such that, on a pivoting of the one pivot clip, the other pivot clip is pivoted in the opposite direction about the same angle. In other words, these two pivot clips are coupled via their respective entrainers to make a common pivoting in respective opposite directions. In this respect, preferably independently of which of the pivot clips is pivoted, the respective other pivot clip is entrained. It is sufficient in this manner to actuate one of these pivot clips directly in order to adjust both simultaneously.

It can be ensured by such a coupling that the pivot clips adopt respective mutually corresponding positions. The one of the pivot clips is in particular exactly in its release position, in its position corresponding to the dead center or in its securing position when the other of the pivot clips is also in its release position, in its position corresponding to the dead center or in its securing position.

In an advantageous further development, the entrainer of the lever limb of the one pivot clip comprises at least one radial prolongation with respect to the respective pivot axis that cooperates with at least one radial prolongation of the entrainer of the lever limb of the other pivot clip such that it acts on this prolongation on an adjustment into the release position and can be acted on by this prolongation to make an adjustment into the securing position. The mutual action takes place in this respect in particular in the respective peripheral direction with respect to the pivot axes of the pivot clips. The prolongations can in this respect engage into one another like fingers or like segments of two toothed wheels. At least one respective prolongation of the one pivot clip and at least one prolongation of the other pivot clip preferably contact one another in every possible pivot position of the pivot clips such that the pivot movement of one of these pivot clips is transmitted directly and substantially without clearance directly to a corresponding pivot movement of the respective other pivot clip.

Supplementary to the above embodiments or also independently thereof, it is furthermore preferred if the respective holding limb is angled and comprises a radial section that extends in at least primarily a radial direction with respect to the respective pivot axis and comprise a tangential section that extends in at least primarily a tangential direction at a distal end of the radial section to block the two-wheeler accessory against a removal from the holder in the securing position of the respective pivot clip when said two-wheeler accessory is received in the holder.

The invention consequently also relates to a holder for a two-wheeler accessory, in particular for a two-wheeler lock, that comprises a base body by which a contact surface is defined that the two-wheeler accessory contacts when it is received in the holder as well as one or more pivot clips that each comprise a holding limb and release position and a securing position to allow a receiving of the two-wheeler accessory in the holder or a removal of the two-wheeler accessory from the holder in the release position and to block the two-wheeler accessory by means of the holding limb against a removal from the holder when said two-wheeler accessory is received in the holder in the securing position, wherein the respective holding limb is angled and comprises a radial section that extends in at least primarily the radial direction with respect to the respective pivot axis as well as a tangential section that extends in at least primarily the tangential direction at a distal end of the radial section to block the two-wheeler accessory against a removal from the holder when said two-wheeler accessory is received in the holder when the respective pivot clip is in the securing position.

Such an angled configuration of the holding limbs of the pivot clips has the advantage that the two-wheeler accessory received in the holder can in particular be blocked against a removal from the holder by the tangential sections. If the two-wheeler accessory is urged toward the tangential sections (for example by vibrations during riding or when an attempt is made to remove the accessory although the pivot clips are in the securing position), for instance in the direction away from the contact surface of the base body, forces are thus in particular exerted onto the pivot clips in the radial direction with respect to the respective pivot axis.

This is in particular the case when the respective tangential section is aligned in parallel with the contact surface in the securing position in accordance with a preferred further development. Such radial forces, however, do not produce any torque about the pivot axis so that the pivot clips are not pivoted hereby, but rather remain in their securing positions. This applies all the more if the tangential section is comparatively short such that an action takes place close to the named end of the radial section by the accessory received in the holder.

An angled configuration of the respective holding limb is in particular advantageous with respect to an arcuate configuration because forces that the two-wheeler accessory exerts on the respective holding limb in the direction of a removal from the holder can result in a torque urging the respective pivot clip into the release position with an arcuate holding limb and thus endanger the secure hold of the accessory in the holder. Arcuate pivot clips would therefore additionally have to be secured against a pivoting open in the securing position, for instance in that their ends facing away from the pivot axis are coupled with one another such that the accessory is surrounded all over its surface in the holder. Such an additional securing is in contrast not necessary in the described holder. Provision can rather be made that the holding limbs of the pivot clips are also spaced apart from one another in their securing positions.

In accordance with a preferred further development, in the release position, the respective tangential sections is outside a space that comprises all the points that are perpendicular above the contact surface. In other words, the tangential sections of the pivot clips release the whole region above the contact surface in the release position so that the two-wheeler accessory can be inserted into the holder in an at least substantially perpendicular direction with respect to the contact surface and can be applied to the contact surface. In the securing position, in contrast, the holding limbs preferably project with the tangential sections into this space such that they block a converse movement of the accessory away from the contact surface and out of the holder.

In accordance with an advantageous embodiment, the tangential extent of the respective tangential section is shorter than half its radial spacing from the respective pivot axis. Provision can be made in accordance with another embodiment that the respective tangential section extends over an angular range of at most 30°, in particular of approximately 25°, about the respect pivot axis. In this embodiment, the extent of the respective tangential section is bounded in the tangential or peripheral direction with respect to the respective pivot axis and is comparatively short. It can hereby additionally be ensured that an action of the tangential section in the direction away from the contact surface in the securing position of the respective pivot clip at least substantially represents an effect of force radial with respect to the pivot axis and thus does not lead to any torque or only to a very small torque about the pivot axis.

It is furthermore advantageous if engagement sections that preferably extend at least substantially in the radial direction away from the pivot axis at the holding limb, are in particular formed at the transition between the radial section and the tangential section. These engagement sections can be configured as projections and advantageously serve to provide engagement points for a manual actuation of the pivot clips. The engagement section of at least one of the pivot clips can, for example, be captured and pressed in the direction of the release position for pivoting the pivot clips from the securing position into the release position (or at least up to the dead center and slightly beyond it). The engagement sections of two pivot clips can in particular be arranged with a holder having a plurality of pivot clips, in particular two pivot clips, such that they can be simultaneously pressed away from one another, for instance by spreading the hand when the one engagement section is acted on by the thumb and the other one is acted on by at least one of the remaining fingers.

In accordance with a preferred embodiment, the holder comprises two pivot clips that are compulsory guided with respect to one another such that, on a pivoting of the one pivot clip about its pivot axis, the other pivot clip is pivoted about its pivot axis by the same angle in the opposite direction. Such a compulsory guidance can, as explained further above, be achieved by the cooperation of entrainers at lever limbs of the pivot clips. In general, however, other kinds of a such a coordinated pivoting of the pivot clips can also be considered, for instance by means of a kind of transmission between the pivot clips that do not necessarily have to have a lever limb for this purpose.

It is further preferred with respect to all the above-described holders if the respective pivot clips are of the same construction with respect to one another and if two pivot clips are preferably arranged axially symmetrical with respect to one another, in particular with respect to an axis of reflection aligned perpendicular to the contact surface. The costs in the production of the holder can be reduced by a design of the pivot clips of the same construction. In addition, the assembly of the holder can be simplified since the pivot clips do not have to be distinguished.

The pivot axis of the respective pivot clip is furthermore preferably stationary, in particular relative to the base body of the holder. Unlike a support of the pivot clips with a respective (elastically) movable pivot axis, a greater stability of the holder can be achieved by a stationary anchorage, the base body of said holder then, just like the pivot clips, preferably in particular being able to be produced from an essentially non-elastic material.

The contact surface of the base body can extend along a longitudinal direction. It is in particular to be understood by this that the surface available for the application of the two-wheeler accessory at the base body has a greater extent in the longitudinal direction than transversely to the longitudinal direction. The contact surface can additionally be configured at least substantially symmetrically with respect to the longitudinal direction, i.e. with respect to an axis of symmetry in parallel with the longitudinal direction or with respect to a plane of symmetry in parallel with the longitudinal direction and substantially perpendicular to the contact surface.

In accordance with an advantageous embodiment, the holder comprises a pivot clip that bounds the contact surface in the longitudinal direction. Such an embodiment can in particular be advantageous if the insertion of the two-wheeler accessory into the holder takes place at least substantially in the longitudinal direction, e.g. by introduction into a pocket-like or quiver-like receiving region such that a removal of the two-wheeler accessory in the opposite longitudinal direction can be blocked by the named pivot clip.

In accordance with a further advantageous embodiment, the holder comprises, additionally or alternatively to the above-described pivot clip, two pivot clips that flank the contact surface transversely to the longitudinal direction. In this respect, the pivot axes of the two pivot clips are preferably arranged in parallel with this longitudinal direction. The pivot clips can thus engage around the two-wheeler accessory received in the holder at two opposite sides with respect to the longitudinal direction. The pivot clips can in particular be applied around the two-wheeler accessory received in the holder from two sides and preferably at least partially on the pivoting into the securing position (namely in particular in the lateral direction with the named radial section and in the direction facing away from the contact surface with the named tangential section of the holding limb of the respective pivot clip). In this manner, the accessory can be secured particularly reliably against a removal.

In accordance with a preferred further development, the base body furthermore has a boundary section that projects from the contact surface and bounds the contact surface in the longitudinal direction. The boundary section can thus in particular restrict a movability of the two-wheeler accessory received in the holder along the longitudinal direction (at least in one direction). In this respect, the boundary section is preferably configured like a shell such that, for application at the contact surface, an end section of the two-wheeler accessory can first be inserted into the shell-like boundary section at an angle to the contact surface and can subsequently be pivoted toward the contact surface. The boundary section can in this respect also serve as a guide for a correct alignment of the two-wheel accessory on the insertion into the holder.

A further boundary section can be provided at the base body in order also to bound the contact surface in the opposite longitudinal direction. Depending on the alignment of the holder, such a further boundary section can be comparatively small or can also be fully dispensable, in particular if it were arranged substantially at the upper end of the base body on a typical arrangement of the holder at the two-wheeler. For in this direction, gravity can already be sufficient to prevent the two-wheeler accessory from leaving the holder although the pivot clips are located in the securing position.

It is furthermore preferred if the base body has one or more guide sections that project from the contact surface and bound the contact surface at least sectionally transversely to the longitudinal direction. The guide sections, optionally in addition to the named pivot clips flanking the contact surface, consequently restrict a movability of the two-wheeler accessory received in the holder in the lateral direction (i.e. transversely to the longitudinal direction) Since, however, unlike the pivot clips, they are preferably rigidly arranged at the base body, they can absorb forces that the accessory exerts on the holder in the lateral direction, for instance as a result of vibrations during riding, and thus in particular contribute to such forces not pivoting the pivot clips out of the securing position into the release position. In addition, they can in particular serve, together with the named boundary section, for the correct alignment of the accessory on insertion into the holder in that they guide the accessory on the application at the contact surface and/or on the insertion into the boundary section.

The named object of the invention is furthermore satisfied by a two-wheeler accessory, in particular a two-wheeler lock, preferably a folding lock, having a holder that is suitably configured for the two-wheeler accessory and that is in particular configured in accordance with one of the above-described embodiments.

The invention will be described in more detail in the following only by way of example with reference to the drawings.

FIG. 1 shows in a perspective representation an embodiment of a holder in accordance with the invention with pivot clips in the release position;

FIG. 2 shows in a perspective representation the same embodiment with a folding lock received in the holder and pivot clips in the securing position;

FIG. 3 shows in a perspective sectional representation the same embodiment with pivot clips in the release position;

FIG. 4 shows in a perspective sectional representation the same embodiment with a folding lock received in the holder and pivot clips in the securing position;

FIG. 6 shows an alternative embodiment in a view from the side with a pivot clip in the release position; and FIG. 7 shows the alternative embodiment in a view from the side with a pivot clip in the securing position.

Figure 5:
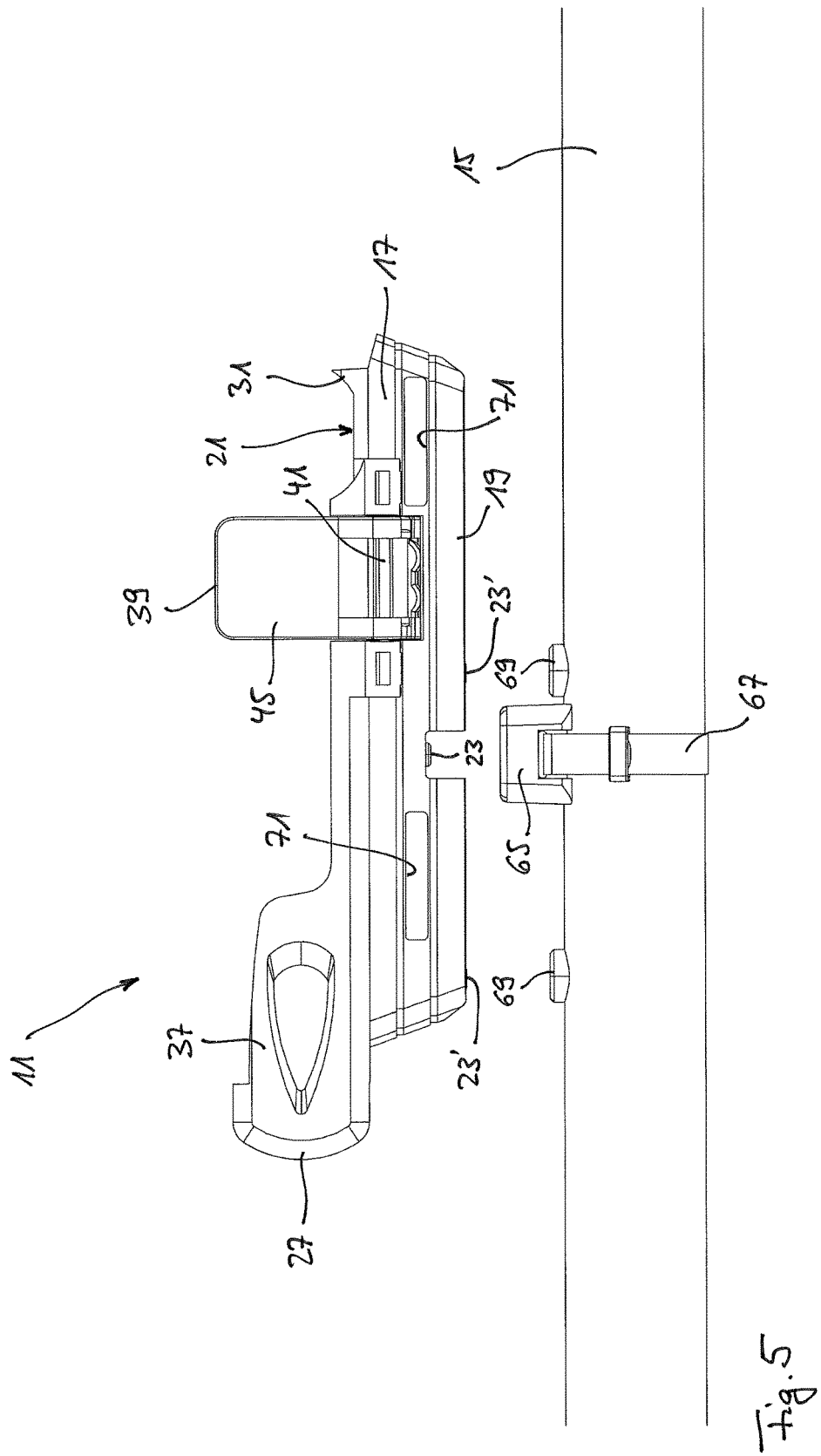
FIG. 5 shows the same embodiment in a view from the side.

The same respective embodiment of a holder 11 in accordance with the invention is shown in FIGS. 1 to 5. The holder 11 is configured suitably for a folding lock 13, i.e. the folding lock 13 can be received in the holder 11 fastened to the two-wheeler for its support at a two-wheeler (of which a frame tube 15 is shown in FIGS. 1, 2 and 5) and can then be reliably held by the holder 11.

As can in particular be recognized in FIG. 1, the holder 11 comprises a base body 17 that extends along a longitudinal direction L. A rear side of the base body 17 is configured to be attached to the frame tube 15 of a two-wheeler. For this purpose, two webs 19 are formed at the rear side that extend in parallel with one another and with the longitudinal direction L (cf. FIGS. 3 and 4) and with which the base body can be placed onto the frame tube 15. Different manners of fastening the holder 11 to the two-wheeler, in particular to the frame tube 15, will be explained further below with respect to FIG. 5.

A contact surface 21 that is substantially formed by a planar surface of the base body 17 is formed at a front side of the base body 17. Even if this surface has recesses such as bores 23, 23' for screws 25 and is thus perforated, the continuous contact surface 21 is defined by this surface. which contact surface the folding lock 13 contacts when it is received in the holder 11 (cf. FIGS. 2 and 4).

The contact surface 21 is bounded in the longitudinal direction L toward an end (at the left in the Figures) by a boundary section 27 that is configured in shell form having a curvature about an axis extending transversely to the longitudinal direction L such that an end section 29 (cf. FIG. 2) of the folding lock 13 can first be inserted into the shell-like boundary section 27 for placement at the contact surface 21 and can subsequently be pivoted toward the contact surface 21.

This boundary section 27, however, does not only serve to simplify a correct insertion of the folding lock 13 into the holder 11, but rather additionally supports the folding lock 13 received in the holder 11 in the longitudinal direction L after the insertion such that its movability in the holder 11 is bounded in the longitudinal direction L. For an additional bounding of the movability in the opposite direction, a further boundary section 31 is provided that is, however, unlike the named boundary section 27, not formed by a kind of wall with a height corresponding to the thickness of the folding lock 13, but only by an edge projecting perpendicular to the longitudinal direction L from the contact surface 21 (cf. FIGS. 1 and 5). This further boundary section 31 is configured to engage between the bars 33 and the lock body 35 of the folding lock 13 when the folding lock 13 is placed onto the contact surface 21 in order thereby additionally to bound the movability of the folding lock 13 in the longitudinal direction L, in particular to prevent it completely together with the boundary section 27.

The lateral guide sections 37 that are formed adjacent to the fastening section 37 as substantially smooth walls projecting from the contact surface 21 and that thereby bound the folding lock 13 at least in the region of its end section 29 transversely to the longitudinal direction L in particular serve for a correct alignment of the folding lock 13 in the holder 11 such that a longitudinal extent of the folding lock 13 is in parallel with the longitudinal direction L of the holder 11.

Two pivot clips 39 that flank the contact surface 21 transversely to the longitudinal direction L are provided for the further lateral bounding of the folding lock 13 in the holder 11 and in particular for securing the folding lock 13 received in the holder 11 against a removal or release (falling out). The two pivot clips 39 are of the same construction and are supported pivotably about a respective pivot axis S at the base body 17. In this respect, the two pivot axes S are aligned in parallel with the longitudinal direction L. The pivotable support of the pivot clips 39 at the base body 17 respectively takes place via a pin 41 that is fastened at a fixed position to the base body 17, extends along the pivot axis S and is guided by bearing lugs 43 of the respective pivot clip 39.

As can be recognized in a comparison of FIGS. 1 and 2 with FIGS. 3 and 4, the pivot clips 39 can be pivoted about their respective pivot axis S between a release position (FIGS. 1 and 3) and a securing position (FIGS. 2 and 4). The space above the contact surface 21 is released in the release position of the pivot clips 39 to the extent that the pivot clips 39 cannot engage into this space such that the folding lock 13 can be led between the pivot clips 39 and can be placed at the contact surface 21 to receive it in the holder 11 or can be released from the contact surface 21 to remove it from the holder 11.

In the securing position, in contrast, the pivot clips 39 engage into this space above the contact surface 21 and thus block a release of the folding lock 13 from the contact surface 21 such that the folding lock 13 is secured against a removal from the holder 11 by the pivot clips 39. The folding lock 13 received in the holder 11 is then held firmly, in particular at least substantially immovably, in the holder 11 by the pivot clips 39 in the securing position and by the boundary sections 27, 31 and the guide sections 37.

As can above all be recognized in the sectional representations of FIGS. 3 and 4, the pivot clips 39 each comprise a holding limb 45 and a lever limb 47 that are at least sectionally formed at least substantially in a planar manner. In this respect, the holding limb 45 is angled and comprises a radial section 49 that extends, starting from the bearing lugs 4, in at least primarily the radial direction (with respect to the respective pivot axis S) and comprises a tangential section 51 that extends at a distal end 53 (i.e. at an end remote from the pivot axis S) of the radial section 49 in at least primarily the tangential direction.

The radial section 49 and the tangential section 51 are aligned at least substantially perpendicular to or in parallel with the contact surface 21 in the securing position of a respective pivot clip 39. Since the pivot axes S are arranged comparatively far outwardly, i.e. projecting laterally over the extent of the contact surface 21 in the direction transversely to the longitudinal direction L, the radial section can thus contact the folding lock 13 received in the holder 11 (cf. FIG. 4) laterally in the securing position and can thus encompass the folding lock 13 in addition to the guide sections 37 transversely to the longitudinal direction L. The tangential section 51 in this respect projects into the region above the contact surface 21 and contacts the upper side of the folding lock 13 such that the angled holding limb 45 engages around a corner of the folding lock 13. In this manner, the folding lock 13 is held reliably at the contact surface 21 and overall in the holder 11.

The tangential section 51 is comparatively short with respect to the radial section 49, in particular shorter than half the length of the radial section 49 such that the tangential section 51 only extends over an angular range of approximately 25° about the pivot axis S. In this manner, the release position and the securing position of the pivot clips 39 only have to differ from one another by a corresponding pivot angle of approximately 25°, in any case preferably by at most 30°, so that the folding lock 13 can pass the pivot clips 39 in the release position and is engaged around them in a flush manner in the securing position of the pivot clips 39.

Due to the angled shape of the holding limbs 45 of the pivot clips 39 and due to the shortness of the tangential sections 51, forces that the folding lock 13 exerts on the pivot clips 39 perpendicular to and away from the contact surface 21 act substantially in the direction radial with respect to the respective pivot axis S. The forces exerted on the tangential sections 51 are in this respect transmitted in the radial direction over the radial section 49 onto the pin 41 fixedly arranged at the base body 17 such that they can ultimately be absorbed by the base body. Torques, in particular in the direction of a pivoting open of the pivot clip 39 into the release position, are thereby not caused or are at least only caused to a small degree. The particular shape of the holding limbs thus not only contributes to a tight engaging around of the folding lock 13, but also to preventing an unwanted pivoting open of the pivot clips 39 and thus a release of the folding lock 13, for instance as a result of vibrations.

A respective engagement section 55 is formed in the region of the distal end 53 of the radial section 49 at the transition between the radial section 49 and the tangential section 51 of the holding limb 45. This engagement section 55 is in particular formed in that the thickness of the tangential section 51, starting from the radial section 49, preferably only reduces on the radially outer side and therefore not the side blocking the folding lock 13 received in the holder 11. An engagement section 55 formed in the manner of an engagement depression 55 such as is shown in the Figures can then, for example, be gripped particularly easily for a manual actuation of the holder 11.

If the engagement sections 55, in particular the radially outer side of the tangential section 51 of the holding limb 45, (differently than shown in the Figures) is shaped in a suitable manner, in particular chamfered, the pivot clips 39 can, for example, also be pivoted open for inserting the folding lock 13 into the holder 11 such that the folding lock 13 is moved in the direction toward the contact surface 21 and is incident onto the engagement sections 55 of the pivot clips, wherein this action is then led off in the direction of the release position due to the shape of the engagement sections 55 with respect to a torque about the pivot axes S acting on the pivot clips. In this manner, the insertion of the folding lock 13 can take place even more easily since the holder 11 does not need to be separately pivoted open, but the pivot clips 39 are rather so-to-say automatically urged apart on the insertion into the folding lock 13 and release the path for the folding lock 13.

Like the holding limb 45, the lever limb 47 of a respective pivot clip 39 also extends at least substantially in a radial direction with respect to the pivot axis S. Unlike the holding limb 45, the lever limb 47 in this respect, however, does not extend laterally with respect to the contact surface 21, but rather substantially beneath the contact surface 21. An application surface 57 is in this respect preferably formed tangentially to the pivot axis S at an end of the lever limb 47 facing away from the pivot axis S.

Since the holder 11 is at least substantially specularly symmetrical to a plane aligned in parallel with the longitudinal direction L and perpendicular to the contact surface 21 and since the two pivot clips 39 of the same construction are arranged almost specularly symmetrically (actually axially symmetrically with respect to an axis of reflection aligned perpendicular to the contact surface), the application surfaces 57 of the lever limbs 47 extending beneath the contact surface 21 are aligned at least substantially toward one another. Their spacing from one another in this respect depends on the respective pivot position of the pivot clips 39. The two application surfaces 57 are in this respect preloaded in the direction of a larger spacing from one another by means of a spring apparatus 59 that is arranged between the two application surfaces 57 and acts as a compression spring.

The spacing of the application surfaces 57 from one another is larger than in the pivot positions disposed therebetween both in the release position shown in FIG. 3 and in the securing position of the two pivot clips 39 shown in FIG. 4. The spacing of the application surfaces 57 from one another is in particular minimal in a pivot position in which the lever limbs 47 are aligned at least substantially in parallel with a plane connecting the two pivot axes S. A dead center of the pivotability of the pivot clips 39 is defined by this pivot position that is preferably located at least substantially centrally between the release position and the securing position since the pivot clips 39 are preloaded in the direction of the release position by the spring apparatus 59 at the side of the dead center facing toward the release position and are preloaded in the direction of the securing position at the side of the dead center facing the securing position.

On a pivoting of the pivot clips 39 beyond the dead center, the pivot movement therefore runs independently, only driven by the spring apparatus 59, as soon as the dead center has been overcome. The pivot movement in contrast takes place against the preload of the spring apparatus 59 up to the dead center. The spring apparatus 59 thus counteracts an adjustment of the pivot clips 39 out of the respective adopted position and thereby contributes to preventing an unwanted adjustment of the pivot clips 39, in particular an unwanted pivoting open of the pivot clips 39 as a result of vibrations during the ride.

The spring apparatus 59 comprises in the embodiment shown two helical springs that are arranged next to one another in the direction of the longitudinal axis L and that are each supported, on the one hand, against the application surface 57 of the one pivot clip 39 and, on the other hand, against the application surface 57 of the other pivot clip 39. In this respect, the helical springs are secured against slippage by pin-like projections in the application surfaces 57 that engage into the helical springs (cannot be recognized in the Figures).

Release sections 61 are formed adjacent to the application surfaces 57 at the lever limbs 47 of the pivot clips 39. Unlike the lever section of the lever limb 47 aligned at least primarily radially with respect to the respective pivot axis S, the release section 61 projects from the lever section (i.e. from the remaining lever limb 47) in the peripheral direction. In this respect, the release section 61 extends from the lever limb 47 otherwise extending substantially beneath the contact surface 21 in the direction toward the contact surface 21.

Depending on the pivot position of the pivot clips 39, the release section 61 in this respect projects through a passage in the surface of the base body 17 defining the contact surface 21 such that it projects beyond the contact surface 21. This is the case both in the release position (cf. FIG. 3) and at the dead enter, which has the result that, if the folding lock 13 is inserted into the holder 11 and is placed at the contact surface 21, the release section 61 is urged back up to and beyond the dead center and the pivot clips 39 are therefore pivoted further up to and into the securing position solely due to the preload of the spring apparatus 59 (cf. FIG. 4). In this manner, the folding lock 13 is automatically secured against a removal or a falling out directly on the insertion into the holder 11.

A respective radial projection 63 is formed at each lever limb 47 at both sides (with respect to the longitudinal direction L) of the application surface 57. The two prolongations 63 of a respective pivot clip 39 form an entrainer of the pivot clip 39. In this respect, the two prolongations 63 of a respective pivot chamber 39 are offset from one another in the peripheral direction with respect to the respective pivot axis S such that a respective prolongation 63 of the one pivot clip 39 runs ahead of a prolongation 63 of the other pivot clip 39 in the peripheral direction and the other prolongation 63 of the one pivot clip 39 trails the other prolongation 63 of the other pivot clip 39 in the peripheral direction. The shape and the offset in the peripheral direction of the prolongations 63 are in this respect such that the prolongations 63 engage into one another at least substantially in each pivot position of the pivot clips 39 and are in contact with one another pairwise.

Such an arrangement then has the advantageous effect that the pivot clips 39 are coupled to one another via the entrainers 63 to make a common pivot movement in opposite pivot directions about their respective pivot axis S. The adjustment of one of the pivot clips 39 thus necessarily has the result of a corresponding adjustment of the other pivot clip 39. It is thereby ensured, on the one hand, that the helical springs 59 are not sheared too much such that they each act in a similar manner on the two lever limbs 47. On the other hand, it is thus sufficient for a manual adjustment of the holder 11 to pivot one of the pivot clips 39 since the other one is carried along via the interaction of the entrainers 63.

The holder 11 is shown fastened to a frame tube 15 of a two-wheeler in FIGS. 1 and 2. Such a fastening of the holder 11 can take place is different manners. The embodiment of the holder 11 shown in this respect advantageously has a plurality of alternative possibilities of fastening.

The fastening of the holder 11 takes place in FIGS. 1 and 2 via an adapter piece 65 (cf. FIG. 5) that is attached tightly to the frame tube 15 about the clamp 67 wound around the frame tube 15 and closed. The adapter piece 65 serves to provide a thread for a screw 25 that is guided through the bore 23 of the base body 17 to screw the base body 17 of the holder 11 to the adapter piece 65.

Two further bores 23' are furthermore formed in the base body 17 and their spacing is adapted to the spacing of two threaded bores 69 (cf. FIG. 5) provided in the frame tube 15 (for instance, for a bottle holder) which can be a common or standard spacing. The holder 11 can thus also be directly screwed to the frame tube 15, alternatively to the fastening via the adapter piece 65, via these bores 23' and suitable screws.

It can furthermore be recognized in FIG. 5 that the base body 17 has two passages 71 that extend transversely to the longitudinal direction L and that have a flat cross-section and are configured such that a respective fastening band (not shown) can be guided through. The holder 11 can then be bound to the frame tube 15 by means of such fastening bands, with the lengthways fixing of the respective fastening band in particular being able to take place in the manner of a hook and loop fastener for a tight fastening of the holder 11 to the frame tube 15.

FIGS. 6 and 7 show an alternative embodiment of a holder 11 that is very similar to the embodiment shown in FIGS. 1 to 5 and is configured as suitable for a folding lock 13 of at least substantially the same kind. The main difference of this alternative embodiment comprises the fact that it has a single pivot clip 39 pivotably supported at end face 73 (with respect to the longitudinal direction L) of the base body 17 instead of the two pivot clips 39 flanking the contact surface 21. The pivot axis S of this pivot clip 39 is thus admittedly like the respective pivot axes S of the two pivot clips 39 in the other embodiment aligned in parallel with the contact surface, but unlike this is aligned perpendicular to the longitudinal direction L.

The contact surface 21 is bounded by the pivot clip 39 in the longitudinal direction L by such an arrangement and alignment of the pivot clip 39. It is particularly advantageous in this respect if, as in the embodiment shown, the boundary section 27 and the guide sections 37 form a kind of pocket or at least surround the two-wheeler accessory 13, when it is received in the holder 11, such that it can essentially only be removed from the contact surface 21 in that it is offset away from the boundary section 27 in the longitudinal direction L or its end section opposite the boundary section 27 in the longitudinal direction L is pivoted away from the contact surface 21. These two movements can then already be reliably prevented by a single pivot clip 39 arranged at the end face 73 of the base body 17 such that the pivot clip 39 is suitable to secure the two-wheeler accessory 13 in the holder 11.

It is generally not precluded in this respect that further pivot clips 39 are provided. An embodiment is thus conceivable, for instance, that is a combination of the holder 11 shown in FIGS. 1 to 5 with the holder 11 shown in FIGS. 6 and 7 and consequently has both two pivot clips 39 flanking the contact surface 21 transversely to the longitudinal direction L and a pivot clip 39 arranged at the end face 73.

The individual pivot clip 39 of the embodiment in accordance with FIGS. 6 and 7 is in turn pivotable beyond a dead center between a release position that is shown in FIG. 6 and a securing position that is shown in FIG. 7. In this respect, a spring apparatus 59 is also shown here that preloads the pivot clip 39 into the release position or into the securing position depending on the side of the dead center at which the pivot clip 39 is located.

For this purpose, the spring apparatus 59 acts on the application surface 57 of the lever limb 47 of the pivot clip 39 (that is guided beneath the contact surface 21 and can therefore not be seen in FIGS. 6 and 7). However, the spring apparatus 59 in this embodiment is not effective between the lever limbs 47 of two pivot clips 39, but is supported against an application surface formed at the base body 17 (cannot be recognized in the Figures). In this manner, the spring apparatus 59, that is in turn configured as a helical spring in the embodiment shown, can preload the pivot clip 39 in the manner of a compression spring in the direction of a larger spacing between the application surface 57 of the lever limb 47 of the pivot clip 39 and the application surface formed at the base body 17, with the position of the smallest spacing representing the dead center.

As can be recognized in FIG. 6, the pivot clip 39 of the release section 61 at the lever limb 47 of the pivot clip 39 extends in the release position through the contact surface 21 and thereby projects upwardly above the contact surface 21. By applying the folding lock 13 for which the holder 11 is provided to the contact surface 21, the release section 61 is urged back beyond the dead center such that then the spring apparatus 59 pivots pivot clip 39 up to and into the securing position (cf. FIG. 7) and subsequently holds it in this securing position. On a pivoting open of the pivot clip 39 into the release position, the release section 61 again exits the contact surface 21 and thus urges the folding lock 13 a little away from the contact surface 21 such that it can be gripped more easily to be removed completely from the holder 11. The insertion of the folding lock 13 into the holder and the removal of the folding lock 13 from the holder 11 is thus also particularly comfortable in this embodiment with only one pivot clip 39.

REFERENCE NUMERAL LIST 11 holder
13 folding lock
15 frame tube
17 base body
19 web
21 contact surface
23, 23' bore
25 screw
27 boundary section
29 end section
31 further boundary section
33 bars
35 lock body
37 guide section
39 pivot clip
43 pin
43 bearing lug
45 holding limb
47 lever limb
49 radial section
51 tangential section
53 distal end
55 engagement section
57 application surface
59 spring apparatus
61 release section
63 radial prolongation, entrainer
65 adapter piece
67 clamp
69 threaded bore
71 passage
73 end face
L longitudinal direction
S pivot axis

The invention claimed is:

1. A holder for a two-wheeler accessory, comprising
a base body that defines a contact surface which the two-wheeler accessory contacts when it is received in the holder; and
one or more pivot clips that each comprise a holding limb and a lever limb and that are pivotable about a pivot axis beyond a dead center position, in which the lever limb extends substantially in parallel to the contact surface, between a release position and a securing position to allow a reception of the two-wheeler accessory in the holder or a removal of the two-wheeler accessory from the holder in the release position and to block the two-wheeler accessory against a removal from the holder in the securing position when said two-wheeler accessory is received in the holder, and a spring apparatus that acts on the respective lever limb and that is configured to preload the respective pivot clip into the release position at one side of the dead center position and into the securing position at the other side of the dead center position.

2. The holder in accordance with claim 1,
wherein the holder comprises two pivot clips; and
wherein the spring apparatus is effective between the lever limbs of the two pivot clips.

3. The holder in accordance with claim 1,
wherein the respective lever limb has an application surface facing away from the respective pivot axis for the application by the spring apparatus, wherein, when the holder comprises a plurality of pivot clips, the spring apparatus is provided between the application surfaces of the lever limbs of the pivot clips and preloads the application surfaces in a direction away from one another as a compression spring.

4. The holder in accordance with claim 3,
wherein the spring apparatus is formed by at least one helical spring or by two helical springs arranged adjacent.

5. The holder in accordance with claim 1,
wherein the lever limb of at least one pivot clip has a release section that projects beyond the contact surface in a direction away from the base body in the release position and optionally also in a position corresponding to the dead center position, but not in the securing position of the respective pivot clip.

6. The holder in accordance with claim 5,
wherein the release section projects in the peripheral direction from a lever section of the respective lever limb aligned at least primarily radially with respect to the respective pivot axis.

7. The holder in accordance with claim 1,
wherein the respective lever limb has an entrainer, wherein, when the holder comprises a plurality of pivot clips the entrainer of the lever limb of one of the pivot clips and the entrainer of the lever limb of another one of the pivot clips engage into one another, such that, on a pivoting of the one pivot clip, the other pivot clip is pivoted in the opposite direction about the same angle.

8. The holder in accordance with claim 7,
wherein the entrainer of the lever limb of the one pivot clip comprises at least one radial prolongation with respect to the respective pivot axis that cooperates with at least one radial prolongation of the entrainer of the lever limb of the other pivot clip such that it acts on this prolongation on an adjustment into the release position and can be acted on by this prolongation to make an adjustment into the securing position.

9. The holder in accordance with claim 1,
wherein the holder comprises a plurality of pivot clips that are of the same construction with respect to one another, and at least two pivot clips are optionally arranged axially symmetrically with respect to one another.

10. The holder in accordance with claim 1,
wherein the pivot axis of the respective pivot clip is stationary.

11. The holder in accordance with claim 1,
wherein the contact surface of the base body extends along a longitudinal direction.

12. The holder in accordance with claim 11,
wherein the holder comprises two pivot clips that flank the contact surface transversely to the longitudinal direction.

13. The holder in accordance with claim 11,
wherein the base body furthermore has a boundary section that projects from the contact surface and bounds the contact surface in the longitudinal direction.

14. The holder in accordance with claim 11,
wherein the base body furthermore has one or more guide sections that project from the contact surface and bound the contact surface at least sectionally transversely to the longitudinal direction.

15. The holder in accordance with claim 1,
wherein the respective holding limb is angled and comprises a radial section that extends in at least primarily the radial direction with respect to the respective pivot axis and comprises a tangential section that extends in at least primarily a tangential direction at a distal end of the radial section to block the two-wheel accessory against a removal from the holder, when said two-wheeler accessory is received in the holder when the respective pivot clip is in the securing position.

16. The holder in accordance with claim 15,
wherein the respective tangential section is aligned in parallel with the contact surface in the securing position.

17. The holder in accordance with claim 15,
wherein, in the release position, the respective tangential section is located outside a space that comprises all the points that are located perpendicular above the contact surface.

18. The holder in accordance with claim 15,
wherein the tangential extent of the respective tangential section is shorter than half its radial spacing from the respective pivot axis;
and/or
wherein the respective tangential section extends over an angular range of at most 30° about the respective pivot axis.

19. The holder in accordance with claim 15,
wherein the holder comprises two pivot clips that are compulsorily guided with respect to one another such that, on a pivoting of the one pivot clip about its pivot axis, the other pivot clip is pivoted in the opposite direction about the same angle about its pivot axis.

20. The holder in accordance with claim 15,
wherein the holder comprises a plurality of pivot clips that are of the same construction with respect to one another, and at least two pivot clips are optionally arranged axially symmetrically with respect to one another.

21. The holder in accordance with claim 15,
wherein the pivot axis of the respective pivot clip is stationary.

22. The holder in accordance with claim 15,
wherein the contact surface of the base body extends along a longitudinal direction.

23. The holder in accordance with claim 22,
wherein the holder comprises two pivot clips that flank the contact surface transversely to the longitudinal direction.

24. The holder in accordance with claim 22,
wherein the base body furthermore has a boundary section that projects from the contact surface and bounds the contact surface in the longitudinal direction.

25. The holder in accordance with claim 22,
wherein the base body furthermore has one or more guide sections that project from the contact surface and bound the contact surface at least sectionally transversely to the longitudinal direction.

26. A two-wheeler accessory, comprising a holder, the holder comprising
a base body that defines a contact surface which the two-wheeler accessory contacts when it is received in the holder; and
one or more pivot clips that each comprise a holding limb and a lever limb and that are pivotable about a pivot axis beyond a dead center position, in which the lever limb extends substantially in parallel to the contact surface, between a release position and a securing position to allow a reception of the two-wheeler accessory in the holder or a removal of the two-wheeler accessory from the holder in the release position and to block the two-wheeler accessory against a removal from the holder in the securing position when said two-wheeler accessory is received in the holder;
wherein the holder further comprises a spring apparatus that acts on the respective lever limb and that is configured to preload the respective pivot clip into the release position at one side of the dead center position and into the securing position at the other side of the dead center position, with the holder being configured to be suitable for the two-wheeler accessory.

* * * * *